Figure 1:
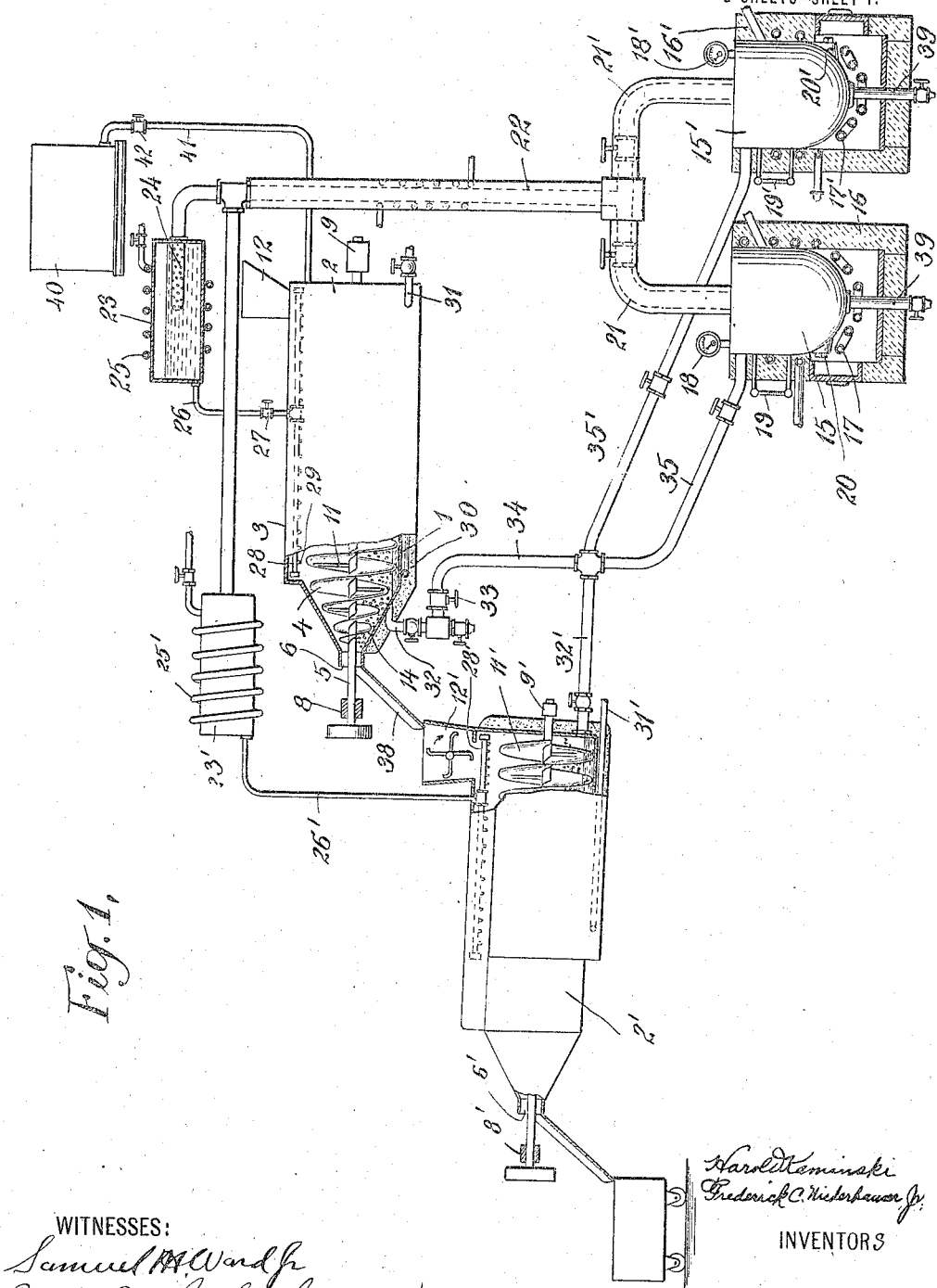

H. KAMINSKI & F. C. NIEDERHAUSER, Jr.
APPARATUS FOR EXTRACTING SOLUBLE CONSTITUENTS FROM VEGETABLE, ANIMAL, OR MINERAL SUBSTANCES.
APPLICATION FILED JAN. 19, 1912.

1,161,135.  Patented Nov. 23, 1915.
2 SHEETS—SHEET 1.

WITNESSES:
Samuel W. Ward Jr.
Marie M. Rothenberger

Harold Kaminski
Frederick C. Niederhauser Jr.
INVENTORS

BY Kenyon & Kenyon
their ATTORNEYS.

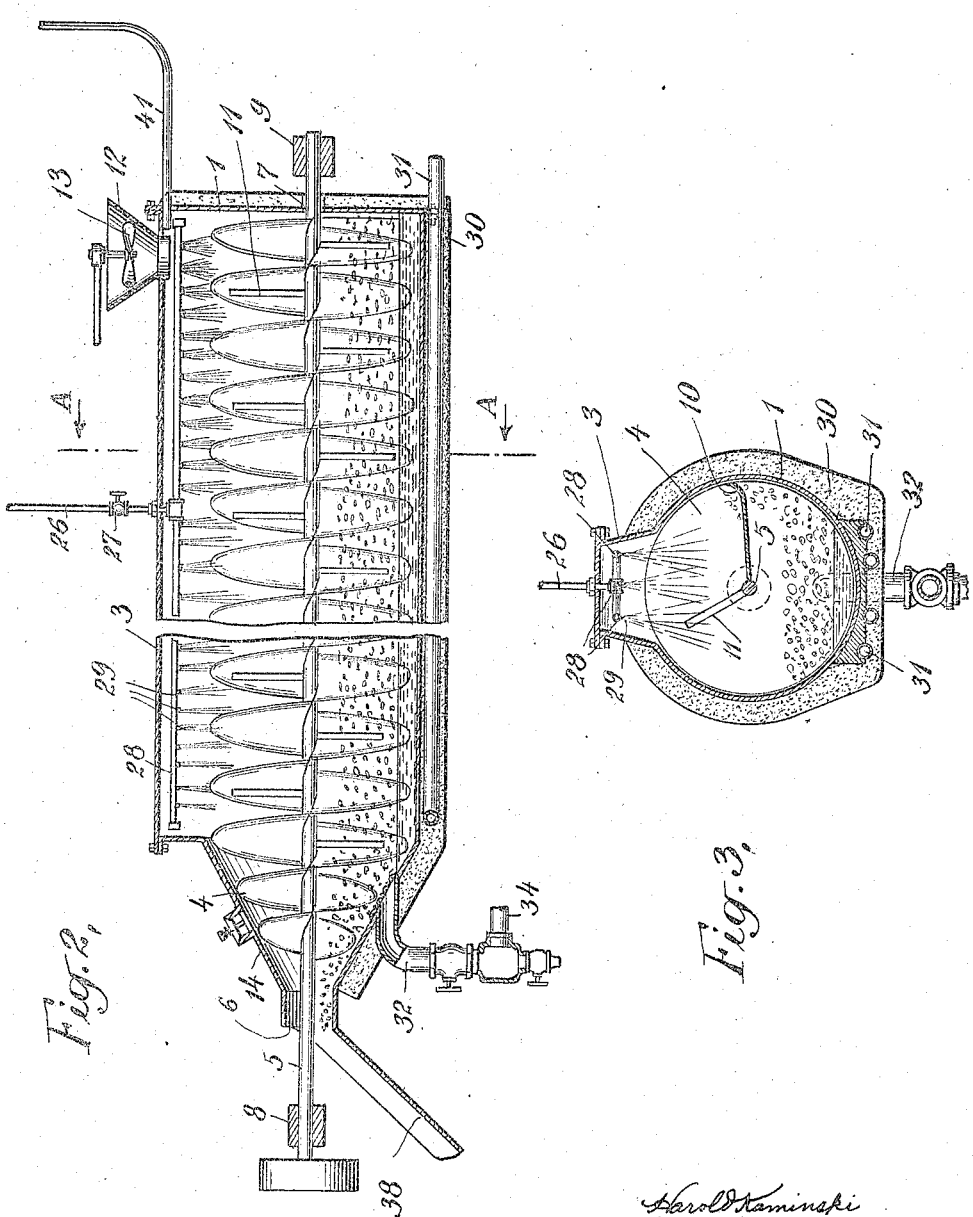

UNITED STATES PATENT OFFICE.

HAROLD KAMINSKI, OF GEORGETOWN, SOUTH CAROLINA, AND FREDERICK C. NIEDERHAUSER, JR., OF PATERSON, NEW JERSEY.

APPARATUS FOR EXTRACTING SOLUBLE CONSTITUENTS FROM VEGETABLE, ANIMAL, OR MINERAL SUBSTANCES.

1,161,135.        Specification of Letters Patent.        Patented Nov. 23, 1915.

Application filed January 19, 1912. Serial No. 672,249.

*To all whom it may concern:*

Be it known that we, HAROLD KAMINSKI and FREDERICK C. NIEDERHAUSER, Jr., citizens of the United States, and residents, respectively, of Georgetown, county of Georgetown, and State of South Carolina, and Paterson, county of Passaic, and State of New Jersey, have invented a new and useful Improvement in Apparatus for Extracting Soluble Constituents from Vegetable, Animal, or Mineral Substances, of which the following is a specification.

Our invention relates to apparatus for extracting soluble constituents from vegetable, animal, or mineral substances, and more particularly to apparatus for extracting resin from crude rubber by mixing the rubber with suitable solvents.

The object of our invention is to provide simple and efficient apparatus by means of which rubber may be rapidly thoroughly and continually de-resinated, and by which the solvent may be recovered and again used without waste.

In carrying out our invention, we provide one or more mixing chambers to which the rubber and resinous solvents may be continuously fed and through which chamber or chambers the rubber is conveyed while being mixed with the solvent, and then discharged therefrom, the solvent being recovered and returned by re-distillation. By such apparatus fresh rubber and solvent may be constantly fed into the mixer and run through and discharged therefrom without having to shut down the mixer to charge the same with rubber or solvent or to discharge the rubber or solvent therefrom.

In the preferred form of our invention, we use two or more mixers through each of which the rubber is run, the mixers being continuously and simultaneously operated.

Our invention will be more readily understood and the objects and advantages of the same will more fully appear from the following description taken in connection with the accompanying drawings forming a part of this specification, and in which—

Figure 1 shows a side elevation of the complete apparatus for de-resinating rubber, certain parts of which are broken away or shown in section; Fig. 2 is a central longitudinal view of one of the mixing chambers shown in Fig. 1; and Fig. 3 is a cross-sectional view of the same, taken on the line A—A of Fig. 2.

Referring to the drawings, Fig. 1 is a horizontal inclosed chamber of general cylindrical shape, comprising a cylindrical portion proper 2 and an upper offset portion 3, and within the chamber we provide a screw conveyer 4 for simultaneously mixing the rubber and solvent and conveying the rubber through the chamber. The screw is secured on a shaft 5 in any suitable manner, and the shaft extends through openings 6 and 7 in the ends of the chamber, and is journaled in bearings 8 and 9. The outer edges of the screw are preferably slightly curved forwardly, as shown at 10, Fig. 3, to more thoroughly mix the rubber by a scooping action which turns a part of the mass of rubber back upon itself as the screw lifts the rubber in moving it along. The shaft is also provided with a plurality of pins or arms 11 for engaging the mass of rubber between the different convolutions to break it up as the shaft is rotated.

The rubber is fed through a hopper 12 by any suitable means, such as by a propeller or short screw 13 the blades of which are arranged to engage the rubber in the hopper and force it downward. The discharge end of the chamber is tapered, as shown at 14, and the adjacent end of the screw is also tapered to conform to the contour of the chamber at this point; and the opening 6 at this point through which the shaft passes is made large enough for the discharge of the rubber therethrough. The taper at this point provides an inclined bottom wall upon which the rubber may be forced before it is discharged, so as to permit a slight packing of the rubber and the draining of the solvent therefrom before it is discharged.

Solvent is supplied to the mixing chamber from one or more tanks or stills 15—15', inclosed in suitable jackets 16—16' and heated by steam coils 17—17' for the purpose of vaporizing the solvent. The tanks are provided with thermometers 18—18' and with liquid gages 19—19' and with manholes 20—20' through which the tanks are cleaned, as hereinafter described. From the tanks lead pipes 21—21' to a main pipe 22 which, in turn, leads to a condenser 23. The pipes 21—21' and 22 are suitably jacketed in order that the solvent vapor may be conveyed therethrough without condensing. The pipes may be simply covered with an asbestos jacket, or they may be heated in any suitable manner and covered, as may be most expedient.

The condenser 23 is preferably in the form of a cylindrical tank into one end of which the pipe 22 enters, the pipe being provided with a nozzle 24 preferably located beneath the level of the solvent in the condenser. The condenser, if desired, may be surrounded by a cooling coil 25 or other suitable apparatus, but if the tank is of the proper size, no cooling apparatus may be needed. A pipe 26 of comparatively small diameter, about one-fifth the size of pipe 22, leads from the bottom of the condenser to the mixing chamber 2, and is provided with a valve 27. The pipe 26 is connected at its end to one or more horizontal pipes or branches 28 which are located within the offset or hood portion 3 of the chamber and extend longitudinally thereof, and are each provided with a series of nozzles 29 through which the solvent is sprayed down upon the rubber. The pipes may be provided with separate nozzles, as shown, or openings may simply be made in the pipes without inserting nozzles therein, as may be desired, but we prefer to use separate nozzle pieces and to space the nozzles on the different pipes so that the nozzles on one pipe will be in staggered relation with respect to those on the adjacent pipe; and we prefer to graduate the opening of the nozzles, placing the smaller nozzles at the tapered end of the chamber, gradually increasing the opening in the nozzles toward the charging end of the chamber. In this manner a relatively greater amount of solution is supplied to the charging end of the chamber than is supplied to the discharge end. The size of the condenser, relative to the pipes 26 and 28, is such that the solvent is delivered through the nozzles under a slight pressure, to insure the proper distribution of the liquid through the different nozzles, and also to assist in preventing their becoming clogged. The idea of placing the spraying apparatus extending longitudinally of the chamber but in an enlarged or offset portion thereof to provide a suitable space between the nozzles and the screw to prevent the former from being clogged, forms one important feature of our invention. The mixing chamber 2 is inclosed in any suitable jacket such as an asbestos jacket 30, and the chamber is heated in any suitable manner such as by steam pipe 31 heat being evenly distributed to the bottom of the chamber through an iron mass, as shown, the iron being a good heat conductor.

In order to return the spent solvent from the chamber to the tanks 15—15', we provide an overflow pipe 32 connected to the chamber so as to convey off any surplus solvent beyond a predetermined amount. We prefer to maintain a depth of about four to six inches of solvent in the bottom of the mixing chamber, and in the present form of our invention, we connect pipe 32 at the tapered portion of the chamber so that the opening of the pipe into the chamber is about six inches above the bottom wall of the chamber. The pipe 32 is provided with a suitable valve 33 and below this valve is connected a pipe 34 leading to pipes 35—35' which empty into the tanks 15—15'.

Where two mixing chambers are used in series through which the rubber is run, we provide a trough 38 which guides the rubber as it is dumped from the discharge opening 6 of the first mixer into the hopper 12' of the second mixer. The second mixer is arranged and constructed substantially as the first mixer above described, except that we prefer to slightly incline the second or last mixing chamber so that the solvent will be more thoroughly drained from the rubber, and we preferably omit the heating coils from the discharge end of this chamber to allow the rubber to be partially cooled before it is discharged. The spraying nozzles are also preferably omitted from this end of the chamber to allow the rubber to partially dry out before being discharged. We connect the solvent overflow pipe 32' at the charging end of this chamber and at such a distance above the bottom of the chamber as will insure the proper depth of the solvent therein. The height above the bottom of the chamber at which the overflow pipe 32' is to be connected will depend upon the angle at which the chamber is inclined. The arrangement and connections should be such that there will be no solvent within about six feet of the discharge end of the last mixing chamber. The overflow pipe 32' connects with pipes 35—35' through which the solvent is conveyed from the last chamber into the tanks 15—15'.

The operation of the preferred form of apparatus above described, is as follows: A suitable solvent, such as acetone, acetone oils, methyl acetone, methyl alcohol, or a mixture of methyl alcohol and acetone; or any other known solvent or combination of solvents, is poured into one of the tanks 15—15' and heat applied thereto. As the solvent evaporates, it passes through the pipes 21 and 22 to the condenser 23 where it is condensed until a suitable amount of the hot solvent forms in the condenser 23, whereupon the valve 27 is opened and the solvent is delivered to the spraying pipes 28 under pressure.

Crude rubber, such as guayule, or Pará rubber, is then emptied into the hopper 12, the rubber, if guayule rubber, being in the form of small globules, and if Pará rubber, being in the form of small lumps into which it is cut or ground. As the rubber is fed through the hopper down into the chamber, it is caught by the screw 4 and moved around against the cylindrical wall of the chamber and toward the discharge opening. The curved or scoop-shaped edges of the screw will catch the rubber and then throw the body of rubber which is nearest the wall of the chamber back upon the rubber near the shaft, thus assisting in the mixing of the rubber with the solvent which is being sprayed down upon it. The arms or pins 11 at the same time beat or strike into the body of rubber between the different convolutions of the screw, thus breaking it up into smaller bodies, so that by the time the rubber reaches the discharge end of the conveyer, it has been thoroughly mixed and saturated with the solvent, which dissolves out the resin therefrom.

The length of the mixing chamber and screw will vary with the number of chambers used and the particular grade of rubber being treated, and will depend upon the percentage of resin which is required to be extracted from the rubber. Ordinarily, in the treatment of guayule rubber for the usual market, we prefer to use two chambers, each about thirty feet long, and we prefer to make the screw of comparatively short pitch so that the rubber will move slowly through the chamber. The total length of mixing chamber, whether there be a single chamber or two or more used, and the pitch of the screw, should be such that the rubber will be under treatment for a period of from thirty to sixty minutes, depending upon the particular rubber under treatment and the percentage of resin necessary to be extracted therefrom.

The rubber in being forced up the tapered portion of the chamber is put under slight pressure, and the solvent is given an opportunity to drain down the inclined wall so that the rubber may not carry too much of the resin-saturated solution with it. The rubber then is guided through the trough or spout 38 into the hopper 12' of the second mixing chamber through which it is conveyed and treated in the manner just described. The discharge end of this mixing chamber is preferably tilted at a slight angle, and two spraying nozzles are provided near this end, so that as much of the solvent as possible is squeezed out of and drained from the rubber before it is discharged from the final mixer.

As the resin-saturated solvent reaches a predetermined depth in the chambers, it is returned through the pipes to whichever of the tanks 15 or 15' happens to be in use, where it is again evaporated, etc. When the solution in either tank becomes too thick due to residual resin from continuous redistillation, the heat from beneath that tank is cut off and heat is supplied to the other tank, while the first tank is emptied through pipe 39, after which the tank may be cleaned through the manhole.

Due to the oily nature of crude rubber it may be desirable, when starting up the operation, to first supply solvent to the mixing chamber which contains a certain percentage of resin in solution for the purpose of more readily "wetting" the rubber with the solvent. The dissolved resin in the solvent causes it to more readily wet the rubber than if the pure distilled solvent were first used, and for this purpose we provide a tank 40, having a pipe 41 leading therefrom to the first mixing chamber 1, the pipe being provided with a valve 42. Before starting up the de-resinating process the valve 42 is opened and a certain amount of the solvent containing a suitable percentage of resin dissolved therein, is delivered from the tank 40 to the mixing chamber after which the valve 42 is closed and pure solvent is then supplied to the chambers from the tanks 15, 15'.

Having thus fully described our invention, what we claim as new and desire to secure by Letters Patent, is:

1. In apparatus of the character described, the combination of a horizontal, laterally closed cylindrical mixing chamber having an opening at one end through which material to be treated is emptied into the chamber, and having an axial discharge opening at the other end, a tank for a solvent, a pipe connecting the tank and upper part of the chamber for conducting solvent to the latter, means for heating said tank to vaporize the solvent, means connected with said pipe and extending along the chamber within the same for discharging solvent along the length of the chamber upon the material therein, a condenser in the connecting pipe between the tank and the chamber for condensing the vaporized solvent, means for heating said chamber, a screw in the chamber for mixing the material with the solvent and moving it through the chamber to the discharge opening while it is being mixed, and a return pipe connecting the chamber and tank and through which the spent solvent is returned to the tank.

2. In apparatus of the character described, the combination of a horizontal, laterally closed cylindrical mixing chamber having an opening at one end through which material to be treated is emptied into the chamber, and having an axial discharge opening at the other end, a tank for a solvent, a pipe connecting the tank and upper part of the chamber for conducting solvent to the latter, means for heating said tank to vaporize the solvent, means connected with said pipe and extending along the chamber within the same for discharging solvent along the length of the chamber upon the material therein, a condenser in the connecting pipe for condensing the vaporized solvent, said condenser arranged and constructed to be of sufficient capacity to maintain a steady stream of solvent delivered to the chamber, means for heating said chamber, a screw in the chamber for mixing the material with the solvent and moving it through the chamber to the discharge opening while it is being mixed, and a return pipe connecting the chamber and tank and through which the spent solvent is returned by gravity to the tank.

3. In apparatus of the character described, the combination of a horizontal, laterally closed cylindrical mixing chamber having an opening at one end through which material to be treated is emptied into the chamber, and having a tapered end portion with an axial discharge opening, a tank for a solvent, a pipe connecting the tank and upper part of the chamber for conducting solvent to the latter, means for heating said tank to vaporize the solvent, means connected with said pipe and extending along the chamber within the same for discharging solvent along the length of the chamber upon the material therein, a condenser in the connecting pipe for condensing the vaporized solvent, means for heating said chamber, a screw in the chamber for mixing the material with the solvent and moving it through the chamber to the discharge opening while it is being mixed, and a pipe connected to the chamber above the bottom thereof and leading to the tank, through which pipe excess solvent is returned from the chamber to the tank.

4. In apparatus of the character described, the combination of a horizontal, laterally closed cylindrical mixing chamber having an opening at one end through which material to be treated is emptied into the chamber, and having an axial discharge opening at the other end, said chamber also having an offset portion, a spraying pipe within said offset portion, a tank for a solvent, means for heating the tank to vaporize the solvent, a pipe connecting the tank and spraying pipe for conducting solvent to the latter, means for heating said mixing chamber, and a screw in the chamber for mixing the material with the solvent and moving it through the heated chamber to the discharge opening while it is being mixed.

5. In apparatus of the character described, the combination of a horizontal, laterally closed cylindrical mixing chamber having an opening at one end through which material to be treated is emptied into the chamber, and having an axial discharge opening at the other end, said chamber also having an offset top portion running longitudinally thereof and provided with a spraying pipe extending longitudinally therein, a tank for a solvent, means for heating said tank to vaporize the solvent, a pipe connecting the tank with the spraying pipe for conducting the solvent to the latter, a condenser in said pipe connection for condensing the vaporized solvent, and a screw in the chamber for mixing the material with the solvent and moving it through the chamber to the discharge opening while it is being mixed.

6. In apparatus of the character described, the combination of a horizontal, laterally closed cylindrical mixing chamber having an opening at one end through which material to be treated is emptied into the chamber, and having a tapered portion at the other end with an axial discharge opening, said chamber also having an offset top portion running longitudinally thereof and provided with a spraying pipe extending longitudinally therein, a tank for a solvent, means for heating said tank to vaporize the solvent, a pipe connecting the tank with the spraying pipe for conducting the solvent to the latter, a condenser in said pipe connection for condensing the vaporized solvent, a screw in the chamber for mixing the material with the solvent and moving it through the chamber to the discharge opening while it is being mixed, and a pipe connected to the chamber above the bottom thereof leading to the tank, through which pipe excess solvent is returned to the tank.

7. In apparatus of the character described, the combination of a horizontal, laterally closed cylindrical mixing chamber having an opening at one end through which material to be treated is emptied into the chamber, and having an axial discharge opening at the other end, and also having an offset portion at the top thereof extending longitudinally thereof, a spraying pipe within said offset portion arranged longitudinally thereof for spraying solvent on the material to be treated, a tank for the solvent, means for heating the tank to vaporize the solvent, a pipe connecting the tank and the spraying pipe for conducting solvent from the tank to the latter, a condenser in said pipe connection of sufficient capacity to maintain a substantial amount of solvent, the portion of said pipe between the condenser and the chamber being relatively small in diameter as compared with the portion of the pipe between the condenser and the tank to maintain a substantial amount of solvent in the condenser.

8. In apparatus of the character described, the combination of a plurality of horizontal, laterally closed cylindrical mixing chambers arranged in series, each chamber having an opening at one end through which material to be treated is emptied, and having a discharge opening at the other end for said material after it is treated, a tank for a solvent, means for heating said tank to vaporize the solvent, pipes leading from said tank to the mixing chambers, a condenser in each of said pipes for condensing the vaporized solvent, means for heating the chambers, a screw in each chamber for mixing the material therein with the solvent and moving it through the chamber to the discharge opening while it is being mixed, and pipes connected to the mixing chambers above the floor thereof and leading to the tank through which pipes excess solvent is returned to the tank.

9. In apparatus of the character described, the combination of a horizontal, laterally closed cylindrical mixing chamber having an opening at one end through which material to be treated is emptied into the chamber and having an inclined end portion with a discharge opening thereat, a tank for a solvent, means for heating the tank to vaporize the solvent, means connecting the tank with the chamber for conveying solvent to the latter, a condenser in the connecting means for condensing the vaporized solvent, means for heating the chamber, a screw in the chamber having its outer edge curved forwardly and serving to mix the material with the solvent and to move the material through the chamber to the discharge opening while it is being mixed, and arms spaced along the screw and also serving to mix the material as the screw is rotated.

10. In apparatus of the character described the combination of a horizontal, laterally closed cylindrical mixing chamber having an opening at one end through which the material to be treated is emptied into the chamber, and having an axial discharge opening at the other end, a tank for a solvent, means for heating said tank, means connecting the tank and chamber for conducting solvent to the latter, means for heating said mixing chamber, a screw in the chamber for mixing the material with the solvent and moving it through the heated chamber to the discharge opening while it is being mixed, the outer edge of said screw being forwardly curved, and arms extending from the axis of said screw and serving to mix the material being treated.

11. An apparatus of the class described, comprising a horizontally arranged cylindrical chamber, having an offset portion at the top part thereof, a spraying device extending horizontally in said offset portion, said chamber having an exit opening at one end, and a screw for mixing the contents of the chamber and forcing them gradually through the exit opening during the mixing operation.

12. An apparatus of the class described, comprising a horizontally arranged cylindrical chamber having an offset portion at the top part thereof, a spraying device extending horizontally in said offset portion, said chamber having an exit opening at one end, and a screw for mixing the contents of the chamber and forcing them gradually through the exit opening during the mixing operation, the edges of said screw being curved forwardly adjacent the periphery of the chamber.

13. An apparatus of the class described, comprising a horizontally arranged cylindrical chamber, a spraying device in said chamber, said chamber having an exit opening at one end, and a screw for mixing the contents of the chamber and forcing them gradually through the exit opening during the mixing operation. the edges of said screw being curved forwardly adjacent the periphery of the chamber.

14. An apparatus of the class described, comprising a horizontal chamber having two outlets therein one for liquid and one for solid material, the outlet for the solid material being above the outlet for the liquid material, means for continuously supplying liquid to said chamber, the height of the liquid in said chamber being limited by the constant overflow thereof into the liquid outlet, and means in said chamber for mixing solid material with the liquid and gradually progressing the solid material toward and through said solid material outlet while fresh solid material is introduced and being mixed.

15. An apparatus of the class described, comprising a horizontal chamber having two outlets therein one for liquid and one for solid material, the outlet for the solid material being above the outlet for the liquid material, means for continuously supplying liquid to said chamber, the height of the liquid in said chamber being limited by the constant overflow thereof into the liquid outlet, and means in said chamber for mixing solid material with the liquid and gradually progressing the solid material toward and through said solid material outlet while fresh solid material is introduced and being mixed, said chamber being provided with an upwardly inclined path adjacent the solid material outlet whereby the solid material is raised above the surface of the liquid before it leaves the chamber to drain the same.

16. An apparatus for deresinating rubber, comprising a horizontal chamber, having two outlets therein one for the solvent and one for the rubber, the outlet for the rubber being above the outlet for the solvent, means for discharging the solvent over the rubber in the chamber, the height of the solvent in the chamber being limited by the constant overflow thereof into the solvent outlet, means for continuously feeding the raw rubber into the chamber at its end opposite the rubber outlet, and means in the chamber for mixing the rubber and solvent and gradually and constantly progressing the rubber toward and through said rubber outlet while fresh rubber is being introduced and mixed.

17. An apparatus for deresinating rubber, comprising a horizontal chamber, having two outlets therein one for the solvent and one for the rubber, means for discharging the solvent over the rubber in the chamber, the height of the solvent in the chamber being limited by the constant overflow thereof into the solvent outlet, means for feeding the raw rubber into the chamber at its end opposite the rubber outlet, and means in the chamber for mixing the rubber and solvent and progressing the rubber toward and through said rubber outlet while fresh rubber is being introduced and mixed.

18. An apparatus of the class described, comprising a plurality of horizontal chambers each having a rubber inlet at one end and a rubber outlet at the opposite end, means for supplying each chamber with liquid solvent and limiting the height of the solvent in the chamber to a point below said rubber outlet, means for feeding the rubber from the rubber outlet of one chamber to the rubber inlet of the next chamber, and means in each chamber for mixing the rubber and solvent and progressing the rubber therein toward and through its rubber outlet while fresh rubber is being introduced and mixed.

19. An apparatus of the class described, comprising a horizontal chamber having a rubber inlet at one end and a rubber outlet at the opposite end, a series of spraying nozzles arranged in a horizontal row longitudinally of the chamber and in the upper part of the chamber for spraying a solvent into the chamber, said nozzles decreasing in size toward the rubber outlet end of the chamber, means for limiting the height of the solvent in the chamber to a point below the rubber outlet, and means for mixing the rubber and solvent in the chamber and progressing the rubber toward and through the rubber outlet while fresh rubber is being introduced and mixed.

20. An apparatus of the class described, comprising a horizontal chamber having a rubber inlet at one end and a rubber outlet at the opposite end, a series of spraying nozzles arranged in a horizontal row longitudinally of the chamber and in the upper part of the chamber for spraying a solvent into the chamber, said nozzles decreasing in size toward the rubber outlet end of the chamber, and means for mixing the rubber and solvent in the chamber and progressing the rubber toward and through the rubber outlet while fresh rubber is being introduced and mixed.

21. An apparatus of the class described, comprising a plurality of horizontal chambers each having a rubber inlet at one end and a rubber outlet at the opposite end, means for supplying each chamber with liquid solvent and limiting the height of the solvent in the chamber to a point below said rubber outlet, means for feeding the rubber from the rubber outlet of one chamber to the rubber inlet of the next chamber, means in each chamber for mixing the rubber and solvent and progressing the rubber therein toward and through its rubber outlet while fresh rubber is being introduced and mixed, and means for heating the first chamber, the last heating chamber of the series being without heating means.

22. An apparatus of the class described, comprising a horizontal chamber having a rubber inlet at one end and a rubber outlet at the opposite end, means for supplying the chamber with liquid solvent, means for limiting the height of the solvent in the chamber to a point below the rubber outlet, means for mixing the rubber and solvent in the chamber and progressing the rubber toward and through the rubber outlet while fresh rubber is being introduced and mixed, heating coils below said chamber, and an iron mass arranged to conduct the heat from said coils to the bottom of the chamber and supply it evenly thereover, substantially as described.

23. An apparatus of the class described, comprising a horizontal chamber having a rubber inlet at one end and a rubber outlet at the opposite end, means for supplying the chamber with liquid solvent, means for mixing the rubber and solvent in the chamber, heating coils below said chamber, and an iron mass arranged to conduct the heat from said coils to the bottom of the chamber and supply it evenly thereover, substantially as described.

24. In apparatus for deresinating rubber, the combination with a horizontal cylinder, adapted to retain a body of liquid, having at one end an opening for the introduction of rubber to be treated and provided at its opposite end with an upwardly inclined surface leading to a discharge opening for rubber, of means for introducing liquid solvent into the cylinder, means for maintaining the surface of such liquid below said opening, a screw in the cylinder for mixing the rubber and solvent and progressively forcing the former up said inclined surface out of the liquid and out of said opening.

25. In apparatus for deresinating rubber, the combination with a horizontal cylindrical chamber adapted to retain a body of liquid and provided at one end with an opening adapted for constantly introducing rubber to be treated and at its opposite end having its walls converging to an axial discharge opening for rubber, of means for comstantly supplying liquid solvent in said chamber, means for maintaining the level of liquid in the chamber below said opening, a screw approximately fitting in said chamber and having its spiral wing provided with a marginal forwardly projecting flange and adapted, as a whole, to mix the materials in the chamber and uninterruptedly force the rubber forward, upwardly out of the liquid and through said opening.

In testimony whereof, we have signed our names to this specification, in the presence of two subscribing witnesses.

HAROLD KAMINSKI.

Witnesses:
  E. T. CAMPBELL,
  J. R. SIAN, Jr.

FREDERICK C. NIEDERHAUSER, JR.

Witnesses:
  SAMUEL M. WARD, Jr.,
  EDWIN SEGER.